United States Patent
Iliffe-Moon

(10) Patent No.: US 12,292,583 B2
(45) Date of Patent: May 6, 2025

(54) APPARATUS, METHOD, AND COMPUTER PROGRAM FOR A VOLUMETRIC DISPLAY

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 943 days.

(21) Appl. No.: 17/301,764

(22) Filed: Apr. 14, 2021

(65) Prior Publication Data

US 2022/0334405 A1    Oct. 20, 2022

(51) Int. Cl.
*G02B 30/56* (2020.01)
*B60K 35/21* (2024.01)

(52) U.S. Cl.
CPC ............ *G02B 30/56* (2020.01); *B60K 35/211* (2024.01)

(58) Field of Classification Search
CPC .... G02B 30/56; B60K 35/65; B60K 2360/29; B60K 2360/741; B60R 11/022
See application file for complete search history.

(56) References Cited

U.S. PATENT DOCUMENTS

| | | | | |
|---|---|---|---|---|
| 5,311,357 A * | 5/1994 | Summer | ................ | G09F 19/18 |
| | | | | 359/479 |
| 6,478,432 B1 * | 11/2002 | Dyner | ................... | G02B 30/56 |
| | | | | 359/730 |
| 2006/0203363 A1 * | 9/2006 | Levy-Rosenthal | .... | G02B 30/56 |
| | | | | 348/E13.043 |
| 2009/0147335 A1 * | 6/2009 | Schumm, Jr. | .......... | G02B 30/56 |
| | | | | 359/33 |
| 2010/0149182 A1 * | 6/2010 | Butler | .................... | G06F 3/011 |
| | | | | 345/424 |
| 2016/0357025 A1 * | 12/2016 | King | ..................... | F21S 43/145 |
| 2019/0250420 A1 * | 8/2019 | Wong | .................. | G02B 17/061 |
| 2020/0290513 A1 * | 9/2020 | Karafin | ............. | G02B 27/0103 |

FOREIGN PATENT DOCUMENTS

JP        2011150213 A  *  8/2011

* cited by examiner

*Primary Examiner* — George G. King
(74) *Attorney, Agent, or Firm* — Kieran O'Leary; 2SPL Patent Attorneys PartG mbB

(57) ABSTRACT

Embodiments relate to an apparatus, method, and computer program for a volumetric display apparatus in a vehicle. The apparatus includes a display in the distal end and an enclosure for the rod with a mirrored interior and an aperture adapted to receive the rod's distal end. The rod and the enclosure are centered on a longitudinal axis passing through the interior. The rod is adjustable along the longitudinal axis of the enclosure from a closed position immediately adjacent to the aperture to an open position that extends from the closed position to the proximal end of the enclosure. A holographic image is formed at the aperture of the enclosure when a plurality of light vectors emitted from the image on the display are reflected off the mirrored surface of the interior while the rod is in the open position.

12 Claims, 10 Drawing Sheets

APPARATUS, METHOD, AND COMPUTER PROGRAM FOR A VOLUMETRIC DISPLAY

FIELD

Embodiments relate to an apparatus, a method, a non-transitory, machine-readable medium comprising a computer program for a volumetric display inside a vehicle.

BACKGROUND

A volumetric or holographic display forms a visual representation of an object in three physical dimensions (3D) in what is commonly referred to as a hologram. The display creates 3D imagery via the emission, scattering, or relaying of illumination from well-defined regions in coordinate space. This contrasts with the flat image of traditional screens that simulate depth through visual effects. When compared to other 3D visualization tools, such as virtual reality, holographic displays offer an inherently different mode of interaction. The holographic display allows an indefinite number of people to view and interact with the holographic image without requiring 3D glasses or other headgear. 3D objects rendered within a holographic display can have characteristics that are the same as real-world objects, including focal depth, motion parallax, and vergence. Furthermore, the unique properties of volumetric displays, such as 360-degree viewing, agreement of convergence, accommodation cues, and their inherent "3D-ness," enable new user interface techniques.

3D display technologies such as holography, stereoscopic displays, and advanced 3D graphics engines generally render 3D images as a two-dimensional display by mapping the coordinates of the 3D images into -D perspective. However, these technologies lack the physiological depth cues needed for true 3D display imaging, such as motion parallax, accommodation, convergence, and binocular disparity. A 3D volumetric display provides the physiological depth cues needed for such applications as automotive design, architecture, and medical imaging.

Despite their benefits, few industries have incorporated holographic or volumetric displays into their products. One drawback to these displays is their limited viewing angle. Another is that any temporary occlusion may break the illusion of the hologram for a viewer. A holographic display in a vehicle environment compounds these challenges. Here, changing road conditions may alter the users viewing angle and the viewers must constantly splitting their attention between display, the road, and other vehicle interfaces. Hence, there may be a desire for an improved holographic display inside a vehicle.

SUMMARY

Embodiments generally relate to an apparatus, a method, and a machine-readable medium for a holographic display inside a vehicle. According to an embodiment, a holographic display apparatus for a vehicle comprises a rod with a proximal end and a distal end, wherein the distal end of the rod comprises a display. Further, there is an enclosure for the rod having a proximal end, a distal end, and an interior. The proximal and distal ends of the enclosure are centered on a longitudinal axis passing through the interior. The interior comprises a surface that is mirrored. The enclosure's distal end comprises an aperture adapted to receive the rod's distal end. Further, the rod is adjustable along the longitudinal axis of the enclosure from a closed position immediately adjacent to the aperture to an open position that extends from the closed position to the proximal end of the enclosure. While the rod is in the open position a holographic image is formed at the aperture of the enclosure. This is formed when a plurality of light vectors emitted from the display converge as they are reflected off the mirrored surface of the interior.

The mirror arrangement allows for the viewing angle to be generally oriented around the normal or perpendicular axis to the digital display rather than oriented about the surface plane of the digital display. In other words, the holographic or virtual image is formed offset from the source image presented on the digital display. The viewing angle of the holographic display creates an "eye box" in which the hologram is visible to any viewers within the eye box. The eye box may be large and might not strictly be a box but rather a 360-degree doughnut that is centered around the center of the mirror (e.g., the longitudinal axis of the enclosures).

The digital image (that is the source image from which the virtual object is formed) can be any digital media that is a static or moving image (e.g., graphical user interface (GUI), rendered 3D object, motion graphics animation, photo image, movie, etc.)

Implementations may include one or more of the following features. The hollow interior of the chamber may be substantially cylindrical. A cylindrical chamber may be space-efficient. Thus, allowing the apparatus to be placed in locations with tighter space allowances, such as in the headliner of a vehicle. The hollow interior of the chamber may be substantially ellipsoidal. An ellipsoidal interior may allow for a larger viewing angle or eye box to be created. This may allow for more users or viewers to see the hologram. Or it may allow for a single user or viewer to maintain their view and avoid occlusion of the hologram for longer periods as their vision moves. An ellipsoidal interior with a larger viewing angle would then require less adjustment to keep the viewer or viewers within the eye box. The rod may be substantially cylindrical. A substantially cylindrical rod maximizes the space efficiency of the apparatus. The rod may comprise a substantially circular display on its distal end. The circular display maximizes the potential viewing angles that the device can produce, thus potentially enlarging the eye box. The aperture may include glass. A glass aperture may protect the interior of the chamber when the rod is in an open position. The glass may also be touch-sensitive, allowing for a method of physical interaction when the hologram is projected. The glass may have an anti-reflective coating which may improve the projection of the hologram through the glass. The vehicle may be configured for transporting at least one passenger and the holographic image may adjust based on the position of the at least one passenger. Perception of the hologram may be maintained if a user, viewer, or another person can maintain their viewing angle without occlusion. When multiple people are viewing the hologram together, adjusting the holographic image may allow the plurality of users to maintain their view of the hologram simultaneously in situations that may not be possible for an apparatus that could not be adjusted.

The holographic image may be adjusted by adjusting the position of the rod in the open position or adjusting the position of the image on the display. Adjusting the position of the image along two axes may allow for a greater range of viewing angles with which to better adapted the hologram to the view of one or more users. The position of at least one passenger may be determined by a measurement apparatus, a plurality of seat settings, or a passenger tracking apparatus.

Using a measurement apparatus or other devices to locate a viewer of the hologram would allow for more accurate adjustment of the hologram to keep the view of the passengers inside the eye box. They may also allow for a more accurate or more immersive eye box for all or a certain passenger. The passenger tracking apparatus may include head tracking, face tracking, or eye-tracking. Tracking a user or viewer's eye may result in a highly accurate estimate of the viewer's viewing angles to accurately adjust the holographic display. Head or face tracking may also produce a similar result with less expensive or specialized equipment. The measurement apparatus may include an occupancy sensor. Using an occupancy sensor may enable more accurate apparatus adjustments than a measurement device alone. For example, if a vehicle only has an eye or head tracking camera for the driver, using an occupancy sensor for a passenger seat may allow the apparatus to be adjusted for a passenger and a driver if a passenger is detected.

The apparatus may be located in the vehicle's armrest, pillar, dashboard, bonnet, headliner, or console. The 3D nature of the hologram allows for non-traditional placement of a screen compared to conventional displays. Furthermore, placing the apparatus in an armrest, pillar, headliner, or another area of a vehicle can make use of space that is non-traditionally used. Implementations of the described techniques may include hardware, a method or process, or computer software on a computer-accessible medium.

One general aspect includes a method for adjusting a holographic display apparatus in a vehicle. The method includes a rod housed in the apparatus having a display at the distal end of the rod. The apparatus has an aperture at the distal end of the apparatus, wherein the aperture is adapted to receive the distal end of the rod. The method also includes obtaining a position of at least one passenger and displaying an image on the display. Then the method uses the position of at least one passenger to adjust the rod along a longitudinal axis of the apparatus or an image position on the display along a surface of the display. By adjusting the rod and the image position positions of a plurality of light vectors emitted from the image on the display are adjusted. The plurality of light vectors converges at the aperture and form a holographic image for at least one passenger. Other embodiments of this aspect include corresponding computer systems, apparatus, and computer programs recorded on one or more computer storage devices, each configured to perform the actions of the methods.

Perception of the hologram may be maintained if a user, viewer, or another person can maintain their viewing angle without occlusion. When multiple people are viewing the hologram together, adjusting the holographic image may allow the plurality of users to maintain their view of the hologram simultaneously in situations that may not be possible for an apparatus that could not be adjusted.

Implementations may include one or more of the following features. The method may include adjusting the rod to a position substantially adjacent to the aperture creates a flat image for at least one passenger at the aperture. Allowing the transition between a hologram and a traditional display allows for the benefits of both. For instance, when a vehicle is driving the display may be a hologram, allowing the user to view information but not interact with it until the vehicle comes to a stop. Then the display may transition to a flat mode where information may be interacted with as if it was a traditional flat-screen touch display.

Obtaining a position of at least one passenger may include receiving at least one passenger's seat position, head position, or eye position. Tracking a user or viewer's eye may result in a highly accurate estimate of the viewer's viewing angles to accurately adjust the holographic display. Head or face tracking may also produce a similar result with less expensive or specialized equipment. Adjusting the rod and the image position to form a holographic image for a plurality of passengers may include obtaining the head position or eye position of the plurality of passengers. Then, calculating the positions of the vectors based on an average position of the plurality of passengers' head positions or eye positions. adjusting the rod and the image position so that the vectors. When a plurality of passengers can view the hologram, the method may adjust the apparatus to provide the best view of the hologram for a plurality of passengers rather than just one. This may be done by determining an average viewpoint between a plurality of passengers and adjusting the device so that the most passengers can fit in the eye box. Or that a special passenger, such as the driver of the vehicle remains in the eye box.

Further embodiments of the method may include ceasing the method when the rod adjusted to a closed position. The method may also include repeating while the rod is in an open position, obtaining the position of at least one passenger, and adjusting the rod and image position of the holographic display apparatus. Displaying the image continues when the rod is adjusted to the closed position. By constantly evaluating the best possible vantage point for viewers of the hologram, the illusion may be maintained more convincingly. Implementations of the described techniques may include hardware, a method or process, or computer software on a computer-accessible medium.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
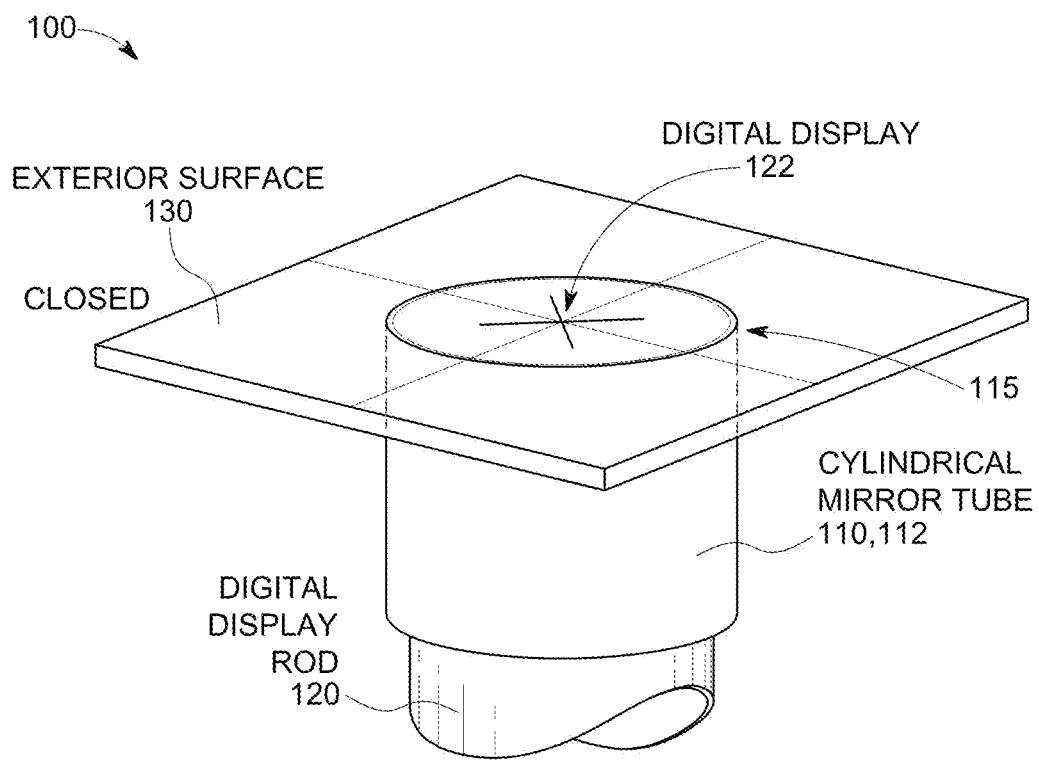
FIGS. 1A to 1C show an embodiment of the apparatus for a holographic display that uses a cylindrical mirror arrangement.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures, same or similar reference numerals refer to same or similar elements and/or features, which may be identical or implemented in a modified form while providing the same or a similar function. The thickness of lines, layers, and/or areas in the figures may also be exaggerated for clarity.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components, and/or a group thereof, but do not exclude the presence or addition of one or more other features, integers, steps, operations, processes, elements, components and/or a group thereof.

Figure 1B:
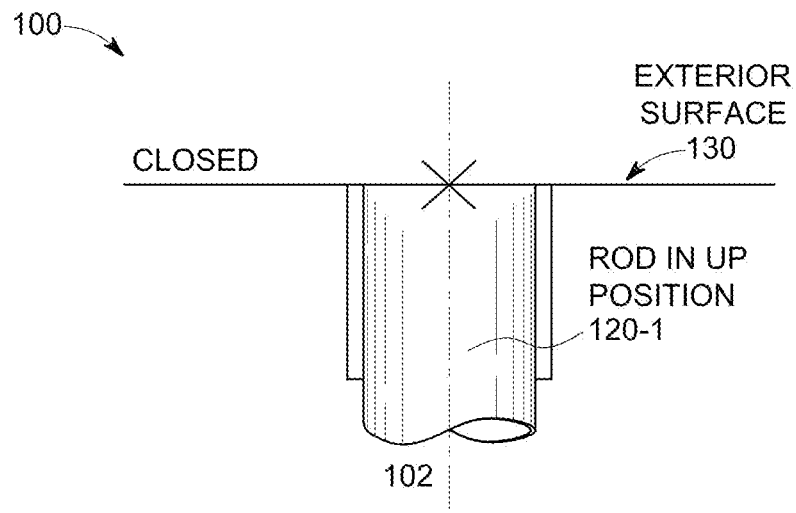
Figure 1C:
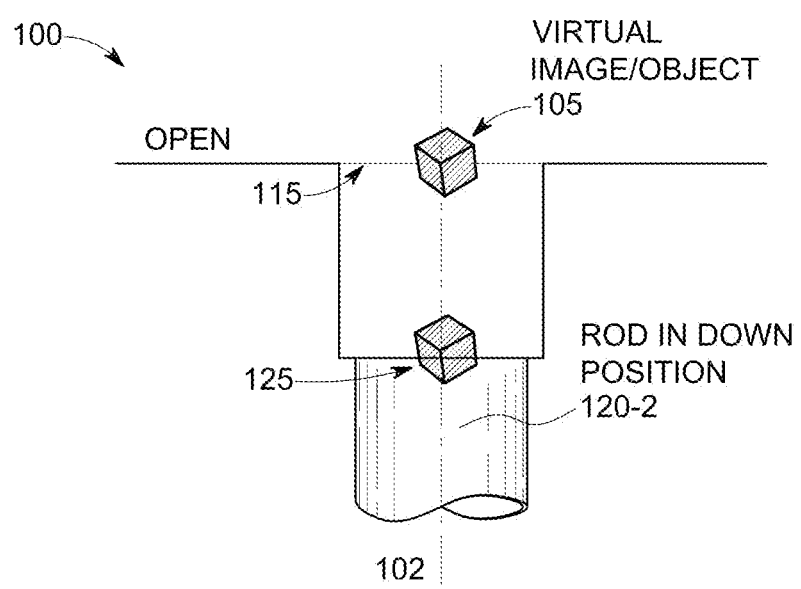

FIGS. 1A to 1C show an embodiment of the apparatus 100 for a holographic display that uses a cylindrical mirror arrangement. FIG. 1A shows a volumetric or holographic display apparatus 100 for a vehicle that may comprise a rod 120 with a proximal end and a distal end, wherein the rod's distal end comprises a display 122. The apparatus 100 further comprises an enclosure 110 for the rod 120 having a proximal end, a distal end, and an interior, wherein the proximal and distal ends may be centered on a longitudinal axis passing through the interior. A surface 112 of the interior may be mirrored. The mirror or mirrored coating of the surface 112 may extend substantially for the entire length of the enclosure 110. If the mirror extends to the proximal end of the enclosure the hologram or virtual image will appear at the proximal end of the enclosure where the mirrored surface terminates. The enclosure's distal end comprises an aperture 115 adapted to receive the rod's 120 distal end. The apparatus 100 may be embedded within a surface of the vehicle, wherein the distal end of the enclosure 110 is flush with, abuts, or is otherwise contiguous with the exterior of the vehicle surface 130. The rod 120 may be adjustable along the longitudinal axis 102 of the enclosure 110 from a closed or up position 120-1 immediately adjacent to the aperture 115 to an open or down position 120-2 that extends from the closed position 120-1 to the proximal end of the enclosure 110. While the rod 120 is in the open position 120-2, a holographic image 105 appears at the aperture 115 of the enclosure 110 when an image 125 from the display 122 is reflected off the mirrored surface 112 of the interior.

A vehicle may be land-, sea-, or air-based. It may include any apparatus used for transportation. Additionally, apparatus 100 is vehicle independent and may be deployed in environments and systems not used or designed for transportation, such as in a home, a retail environment, public spaces, an office.

A digital display 122 may be a conventional digital display such as an electroluminescent (ELD), liquid crystal (LCD), light-emitting diode (LED), thin-film transistor, organic LED (OLED), active-matrix OLED (AMOLED) plasma (PDP), quantum dot (QLED), cathode ray tube, or segment displays. The display may have additional properties such as capacitive, acoustic, or infrared touchscreen properties. The display may be circular and have a diameter between 40 to 70 mm. The display may be mounted on one end, which may be referred to as a distal end, of a movable rod. The rod or its distal end may be circular and have a diameter between 40 to 80 mm. The display, therefore, may take up all or part of one face or end of the rod. The larger surface area of the rod's end that comprises the display may result in a larger holographic image. The movability or adjustability of the rod may allow the rod to closer or fill in the aperture of the apparatus's enclosure. Adjusting the rod away from the opening or aperture 115 retracts the rod into the enclosure and the mirror arrangement.

The rod is adjustable along a longitudinal axis 102 between an open and a closed position 120-1, 120-2. FIG. 1B shows the rod in the closed position. FIG. 1C shows the rod in the open position. The rod may not be 100% open or closed but may have variable positions such as 25%, 50%, 75%, or 100% open, or any value between 0% and 100% along the axis. Moving or adjusting the rod may be done by an actuator. An actuator may be a gear, electric, electromagnetic, pneumatic, hydraulic, or solenoid actuator adapted to the rod that it adjusts. Common examples of actuators that may be used include an electric motor (i.e., electro-mechanical, such as a motor connected to a geared, cam, or screw arrangement), a servo motor, a bimetallic actuator, electromechanical linear actuator, or memory alloy actuator. A controller for the actuator or the apparatus 100 may be located within apparatus 100 or be external to apparatus 100. The controller may be any electronic device, including a processor that is configured to control the rod and the display of the apparatus. The apparatus 100 may include features to allow for silent operation or reduce the mechanical noise of the actuator. This may be done with the addition of damping material.

The rod 120 of the apparatus 100 may be substantially cylindrical. A cylindrical rod may improve the viewing angles and allow for a larger display inside the enclosure. The entirety of the rod may not be cylindrical. For example, if the proximal end of the rod 120 that houses the display is adapted to fit the enclosure 110 or the aperture 115 (e.g., circular) the remainder of the rod may be any shape that facilitates the installation or movement of the apparatus. For example, the rod may be conical or shaped like a golf tee. The digital display 122 may also be curved, A curved display may provide greater surface area and thus allow for more light to be emitted and more rays or vectors to be projected at more angles, which increases the fidelity of the virtual image 105.

When in the open or down position 120-2 the digital display 122 may be positioned relative to the focal point and viewing angle (e.g., 3D space that is the eye box) such that the virtual object is correctly formed for the user's position. This opening and closing rod feature provides benefits, for example: providing visual theater to the overall experience, revealing the virtual effect, protecting the mirror arrangement, and allowing the digital display to be cleaned.

The aperture 115 of the apparatus 100 may comprise glass. The aperture in the mirror arrangement which is the area in which the virtual image appears to form can be covered with glass (e.g., glass with optical coatings such as anti-reflective and anti-fingerprint). The aperture may also remain open or exposed to the environment to avoid obstruction of the virtual image 205.

More details and aspects are mentioned in connection with the embodiments described above and/or below. The embodiment shown in FIGS. 1A to 1C may comprise one or more optional additional features corresponding to one or more aspects mentioned in connection with the proposed concept or one or more examples described above and/or below.

Figure 2A:
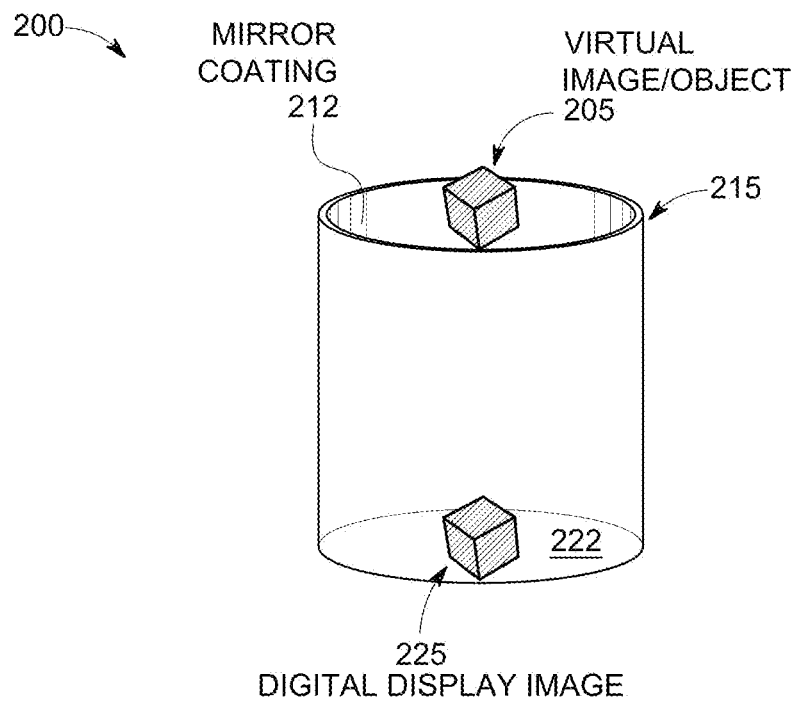
FIGS. 2A and 2B show an example of the viewing angles for a holographic display apparatus that uses a cylindrical mirror arrangement.
Figure 2B:
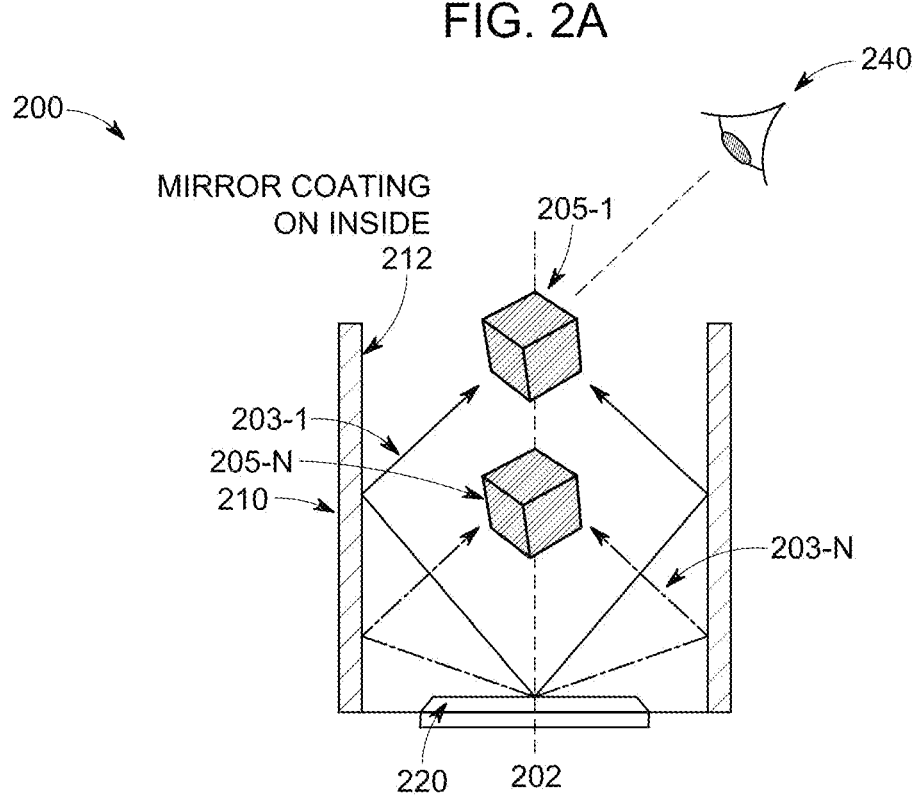

FIGS. 2A and 2B show an embodiment of apparatus 200 where the interior of the chamber or enclosure 210 is substantially cylindrical. The depictions in these figures show an example of the viewing angles for a holographic display apparatus that uses a cylindrical mirror arrangement. FIG. 2A shows a volumetric or holographic display apparatus 200 with a cylindrical enclosure 210 that has a mirrored or reflective surface 212. In a cylindrical mirror arrangement, a cylindrical mirror (i.e., a mirror is located on the interior of the cylinder or when the entire enclosure 210 is a mirror) with a digital display 222 is located at the bottom of the mirror arrangement. When the apparatus 200 was in operation and the rod in an open position, the viewer would see the virtual image or object floating centered in the aperture along the longitudinal axis 202 and parallel or transverse to the proximal end of the mirrored coating 212. The image from the digital display 222 is projected through the mirror arrangement, such that the virtual image is formed relative to the viewers' viewing angle of the apparatus.

FIG. 2B. shows a schematic cross-section of a cylindrical embodiment of the apparatus 200 with representations of how a plurality of rays 203 projected from the digital display image 225 are reflected off the mirrored coating 212 on the inside of the cylindrical enclosure 210. A ray is the emission, scattering, or relaying of illumination from the digital display 220. The mirrored cylindrical enclosure 210, 212 reflects rays 203-1, 203-N from an image presented on a display 220. The vectors or rays pictured are just for illustrative purposes. In practice, there are a theoretically infinite number of rays emitted from the display. The mirrored cylindrical enclosure 210, 212 behaves like an axicon creating a continuous plurality of images 205-1, 205-N along the longitudinal axis 202 of the mirrored cylindrical enclosure 210, 212. Only two images in FIG. 2B for simplicity however an infinite number of images are created. A viewer 240 then perceives the totality of the images 205-1, 205-N as a single holographic image 205 with depth at the aperture 215. The perceived image 205 is not technically an image as not all the rays coming from the display go through a single point. However, viewer 240 does perceive the continuum of images as such. The viewer can move in the axial direction and the compendium of images follows the viewer's movement. Additionally, the image is rotated 180 degrees around the axis of the cylindrical enclosure with respect to the display image. because the viewer 240 with approximately a 360-degree spherical viewing angle in which the image changes as the viewer moves around.

Figure 3A:
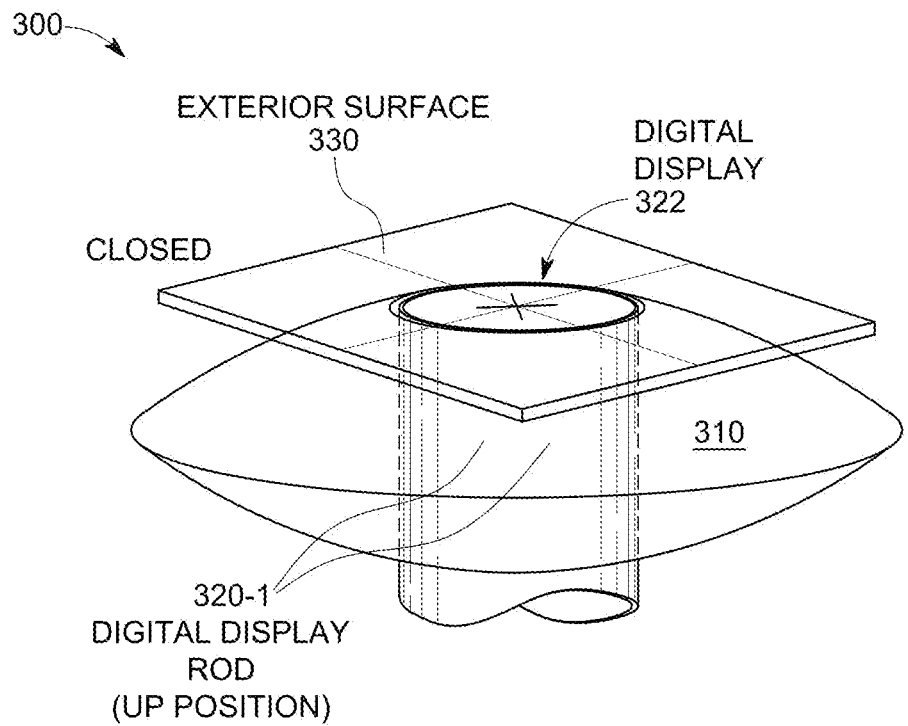
FIGS. 3A to 3D show an embodiment of the apparatus for a holographic display that uses a parabolic mirror arrangement.
Figure 3B:
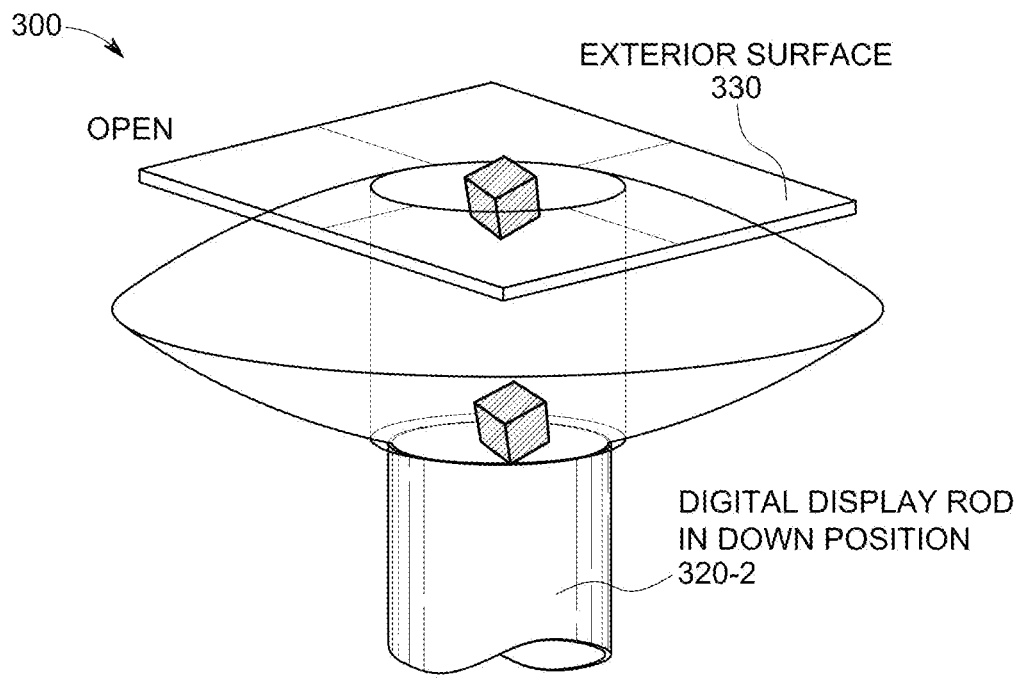
Figure 3C:
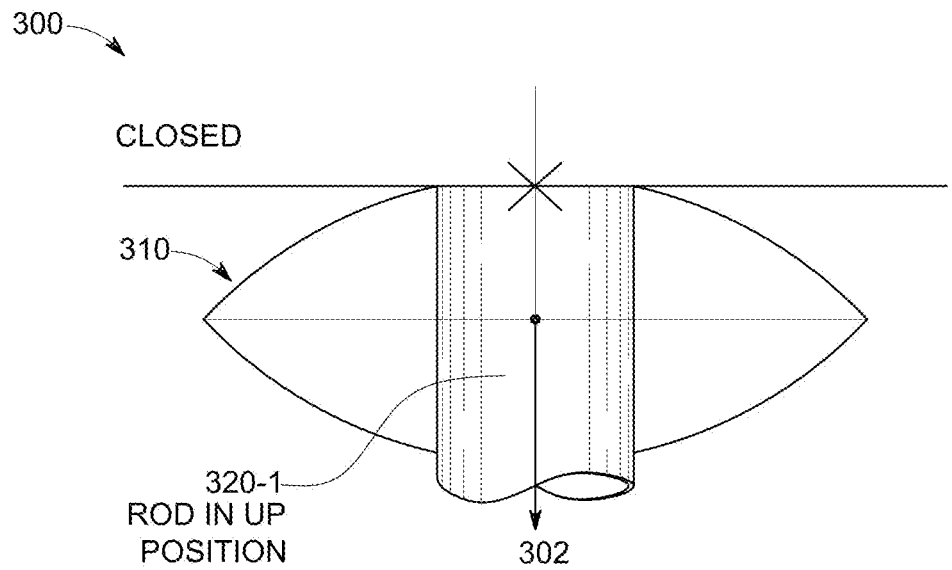
Figure 3D:
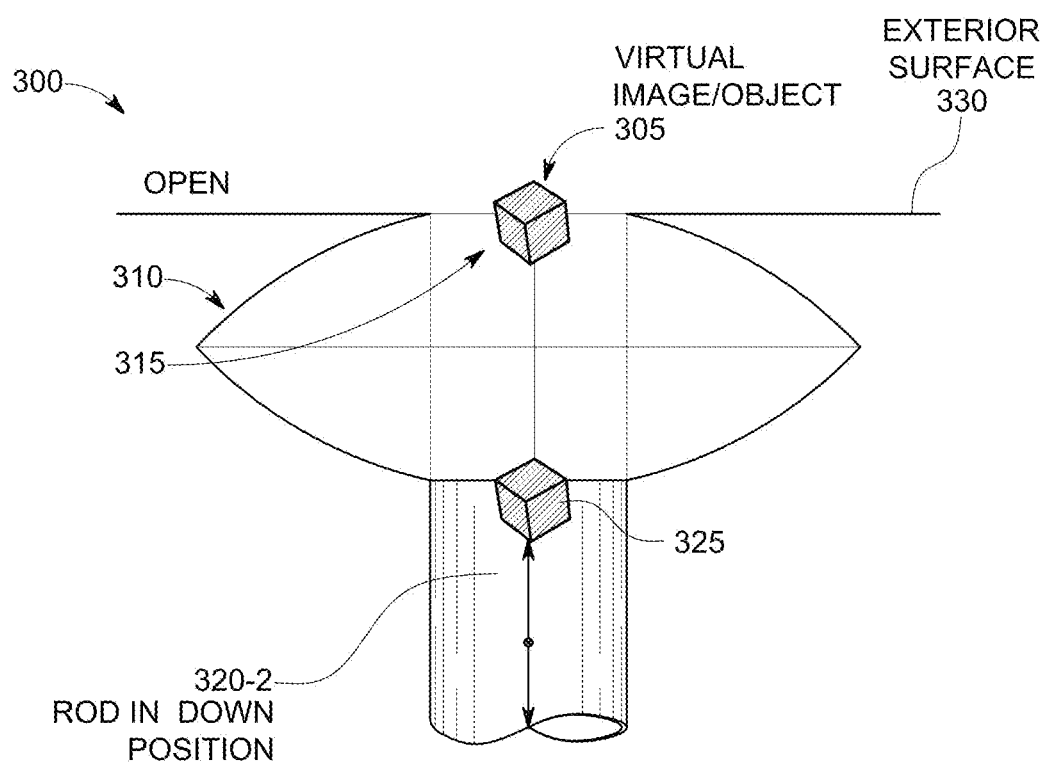

FIGS. 3A to 3D show an embodiment of the apparatus for a holographic display that uses a parabolic mirror arrangement. FIG. 3A shows a holographic display apparatus 300 with a hollow interior chamber 310 that is substantially ellipsoidal. The mirrored surface of the ellipsoidal interior chamber 310 forms an inverted parabolic mirror. The rod 320 of the apparatus 300 is adjustable along a longitudinal axis 302 between an open and a closed position 320-1, 320-2. When the rod is in the closes position a digital display 322 on the rod's 320 distal end is substantially co-planer or parallel with an exterior surface 330. If the aperture of the apparatus 300 comprises glass or is otherwise filled in with a transparent material, the display may abut the aperture's glass or transparent material. FIG. 3B shows a side profile view of the holographic display apparatus 300 with the rod in an open position 320-2. FIG. 3C shows a cross-section view of the rod 320 in the closed or up position 320-1. FIG. 3D shows a cross-section view of the rod in the open or down position 320-2. When the rod 320 is in the open position 320-2 a virtual image 305 may form at the aperture of the apparatus 300 substantially parallel with any exterior surface 330. The rod may not be 100% open or closed but may have variable positions such as 25%, 50%, 75%, or 100% open, or any value between 0% and 100% along the axis. Moving or adjusting the rod may be done by an actuator. A controller for the actuator or apparatus 300 may be located within apparatus 300 or be external to apparatus 300. The controller may be any electronic device, including a processor that is configured to control the rod and the display of the apparatus.

The rod 320 of the apparatus 300 may be substantially cylindrical. A cylindrical rod may improve the viewing angles and allow for a larger display inside the enclosure. The entirety of the rod may not be cylindrical. For example, if the proximal end of the rod 320 that houses the display is adapted to fit the enclosure 310 or the aperture 315 (e.g., circular) the remainder of the rod may be any shape that facilitates the installation or movement of the apparatus. For example, the rod may be conical or shaped like a golf tee When in the open or down position 320-2 the digital display 322 may be positioned relative to the focal point and viewing angle (e.g., 3D space that is the eye box) such that the virtual object is correctly formed for the user's position. This opening and closing rod feature provides benefits, for example: providing visual theater to the overall experience, revealing the virtual effect, protecting the mirror arrangement, and allowing the digital display to be cleaned.

The aperture 315 of the apparatus 300 may comprise glass. The aperture in the mirror arrangement which is the area in which the virtual image appears to form can be covered with glass (e.g., glass with optical coatings such as anti-reflective and anti-fingerprint). The aperture may also remain open or exposed to the environment to avoid obstruction of the virtual image 305.

Figure 4A:
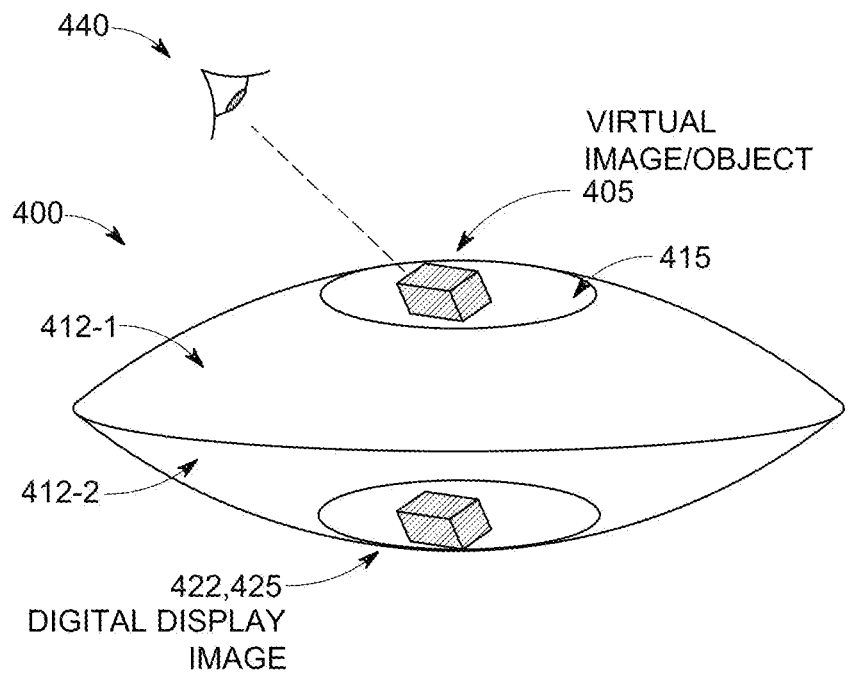
FIGS. 4A to 4C shows an example of the viewing angles for a holographic display apparatus that uses a parabolic mirror arrangement.
Figure 4B:
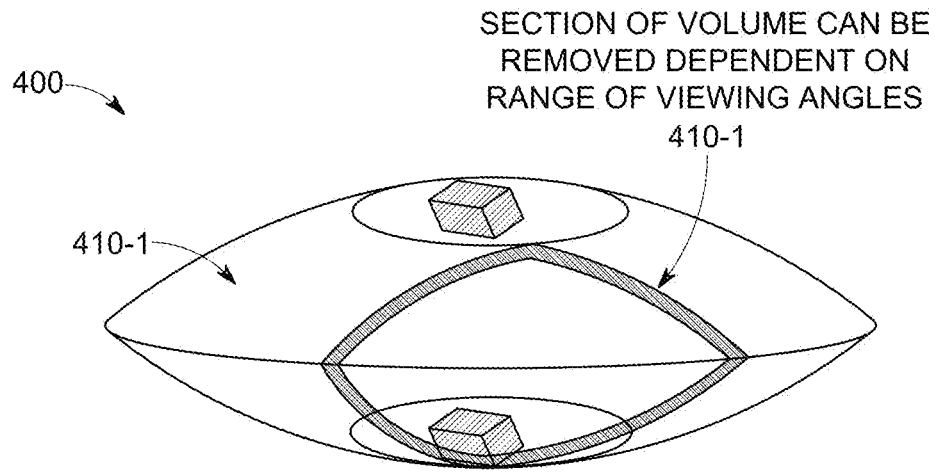
Figure 4C:
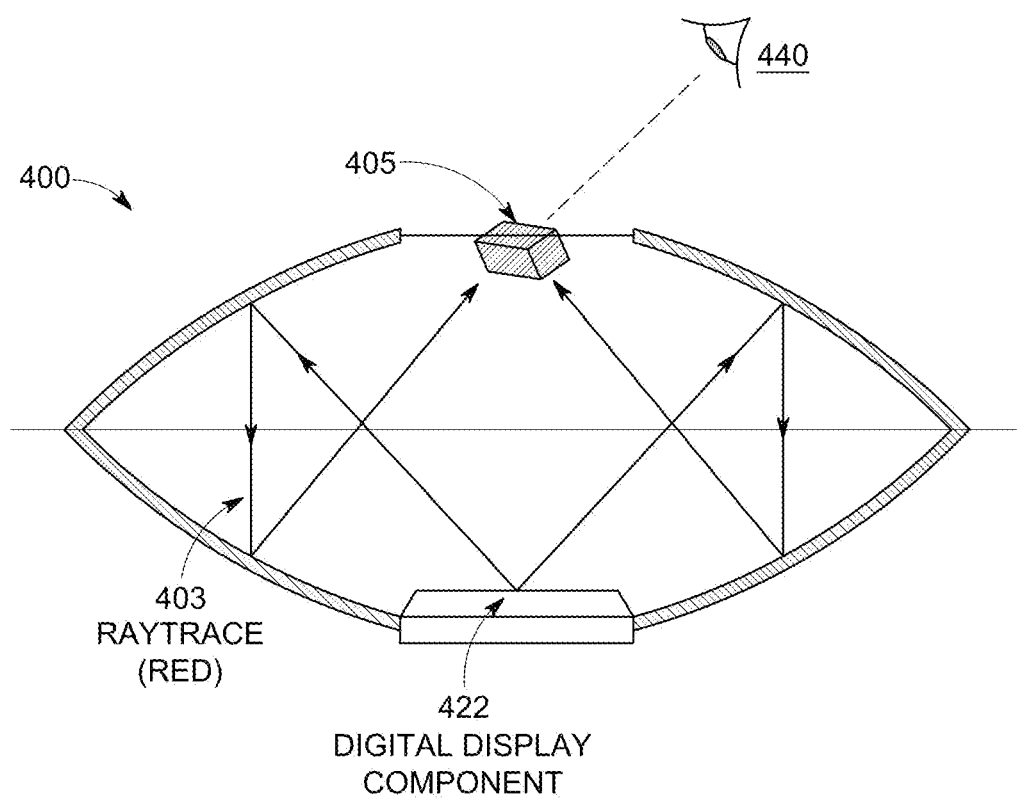

FIGS. 4A to 4C shows an example of the viewing angles for a holographic display apparatus that uses a parabolic mirror arrangement. FIG. 4A shows a volumetric or holographic display apparatus 400 with ellipsoidal enclosure 410 that has a mirrored or reflective surface 412 creating a parabolic mirror arrangement. In a parabolic mirror arrangement, there may be two inverted parabolic mirrors 412-1, 412-2 (e.g., Mirage Opti-Gon International) with a digital display 422 is located at the bottom of the mirror arrangement. In this example, the dual mirror arrangement 412-1, 412-2 makes up the enclosure. When the apparatus 400 is in operation, an image 425 is shown on the digital display 422, and the rod is in an open position, the viewer 440 may see the virtual image or object 405 floating centered in the aperture 415 along the longitudinal axis and parallel or transverse to aperture 415.

FIG. 4B shows a reduced mirror arrangement. The mirror arrangement that makes up the enclosure 410 may be reduced 410-1 in plan view if a 360-degree view is not required and the user view on the device is constrained (e.g., in a rear seat of a vehicle, the mirror arrangement may be reduced by approximately 30-40%). The reduced mirror arrangement may form a partial ellipsoid or a partial cylinder. In some embodiments, it may be preferable for the enclosure to form a partial ellipsoid rather than a full cylinder. A cylindrical mirror occupies a smaller volume than the parabolic or ellipsoidal arrangement, but the cylindrical mirror may exhibit more aberrations (e.g., dependent on view angle and relationship between the digital display and mirror).

The apparatus 400 may be located in a vehicle's armrest, pillar, dashboard, hood or bonnet, headliner, or console. The apparatus 400 may be located on any interior or exterior interior surface or panel of the vehicle (e.g., seats, headrests, handles, steering wheel, displays, buttons, switches, etc.). Structures like a seat cover, a sunshade, a sunroof shade, a parcel shelf, and a trunk cover may receive greater exposure to sunlight.

FIG. 4C shows a cross-section of apparatus 400 with an example of the rays 403 as they are reflected off the mirror arrangement to produce a virtual object 405 at the aperture of apparatus 400. Only one set of rays 403 are shown here; however, it is to be understood that a plurality of rays are emitted from display 422 that create a series or compendium of virtual images extending from the aperture to the digital display along a longitudinal axis of the apparatus 400.

Figure 5:
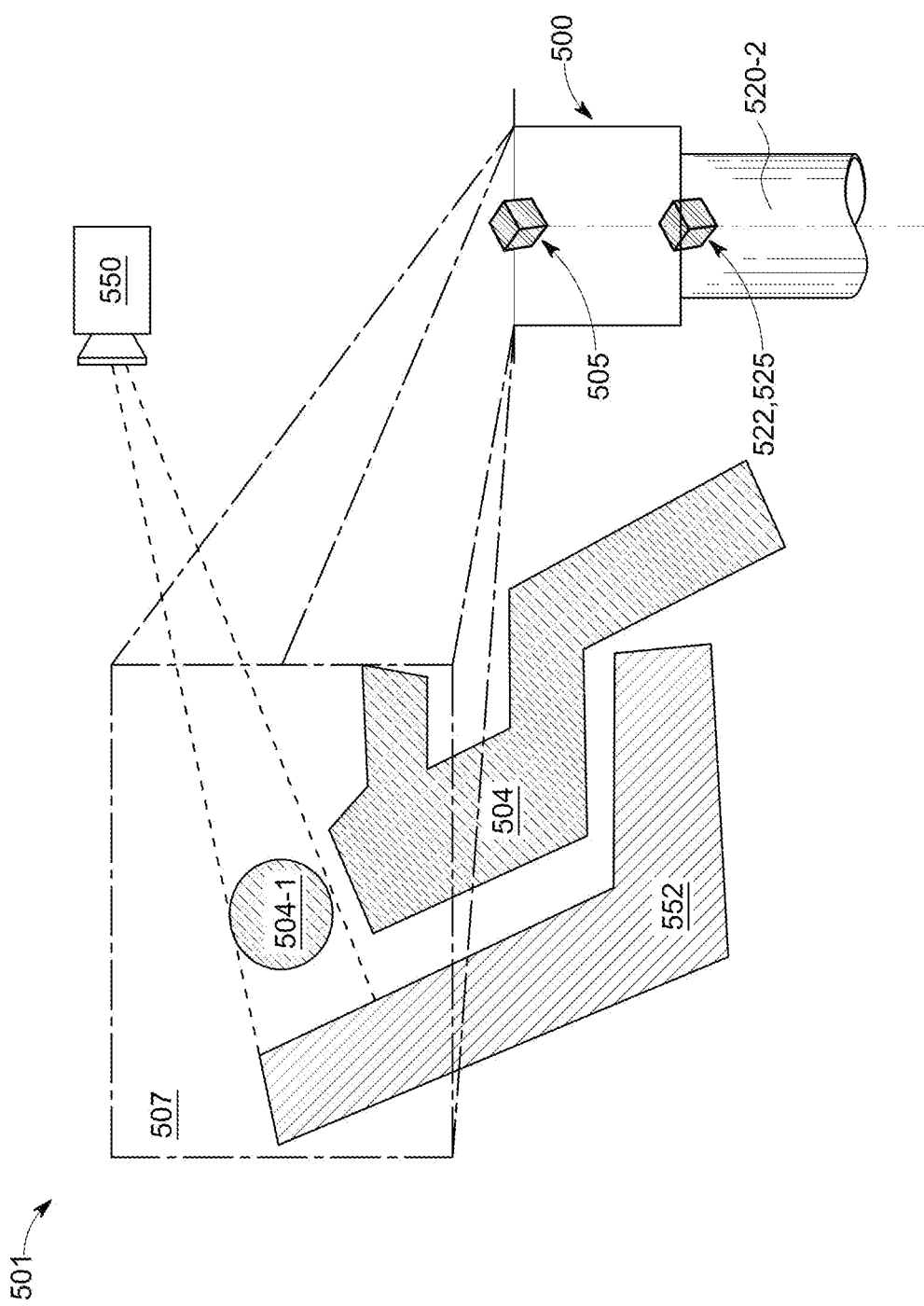
FIG. 5 shows a schematic view where a measurement device adjusts an embodiment of a holographic display apparatus to align an eye box with the view of a user.

FIG. 5 shows a schematic view 501 where a measurement device 550 adjusts an embodiment of a holographic display apparatus 500 to align an eye box 507 with the view of a user 504. The apparatus 500 may comprise at least one passenger 504 and the holographic image 505 is adjusted based on the position of at least one passenger 504. The viewing angle of the holographic display apparatus 500 creates an "eye box" in which the hologram is visible to any viewers 504 within the eye box. The eye box may be large and might not strictly be a box but rather a 360-degree doughnut that is centered around the center of the apparatus (e.g., the longitudinal axis of the enclosure).

Adjusting the holographic image may be done by adjusting the position of the rod in the open position 520-2, adjusting a position of the image 525 on the display 522, or both. Adjusting the open rod 520 and the position of the image 525 on the display 522 allows for the adjustment of the image in both the lateral and vertical directions. This then modifies the eye box 507 in which a user can better see the holographic image 505. By adjusting the eye box 507 so that the user 504 or, in particular, the user's head 504-1 is always contained within the eye box 507, the perception of the holographic image 505 can be preserved.

Head, facial, and eye-tracking may allow the digital image 525 to be adapted to create a more realistic 3D effect in the virtual object 505, such that with the movement of the user's head a 3D effect (i.e., looking around the object) and parallax effect can be created.

The position of one or more viewers or passengers 504 may be determined by a plurality of seat 552 settings, a head, face, or eye-tracking apparatus 550, or any other measurement apparatus, such as a ride handling measurement device. A ride handling measurement device may measure the smoothness of a vehicle's ride and adjust the eye box 507 created by the apparatus 500 for any unevenness. Other measurement apparatuses may include hand, finger tracking, and gesture recognition. These may be used to allow interaction with the virtual object. 525. In an example, the virtual object may be a representation of the Intelligent Personal Assistant (IPA) or another avatar of a system. The system can be combined with multi-sensory aspects or integrated with other vehicle sub-systems, such as ambient lighting, digital light projection, sound effects, haptic (e.g., ultrasonic mid-air haptic, climatization airflow), scent, etc. With the combination of hand, finger, and other interaction tracking or measurement apparatuses, the virtual image 505 can be stabilized in a way that it appears to the viewer that they are interacting with the hologram 505. Furthermore, the virtual image 505 can act as a representation of or control of a plurality of vehicle systems, such as a vehicle's climate, entertainment, communication, navigation, or operating systems.

In some embodiments, vehicle data can be used to control the system of apparatus 600. For example, the vehicle mode, if the vehicle is parked, or in motion may be used to adapt the digital image and the virtual object. Additionally, other data, such as the ambient lighting, direction of sunlight, vehicle dynamics can be used to improve the quality of virtual image 505.

A measurement apparatus may also include devices for external sensing (e.g., camera, Lidar, radar, etc.) of the user's hand or finger position. These positions may be used to create an interaction model whereby the user can touch and interact with the virtual object. For example, the virtual object may be a virtual 3D representation of the IPA (Intelligent Personal Assistant) or an emblem such as a hood ornament or another brand badge.

This apparatus 600 may be part of a multi-sensory experience, combining visual, touch haptic, and sound effects experiences. Visual experiences may include illumination or digital projection of the surrounding space in the vehicle cabin.

Additional vehicle data can also be used to enhance the display of the image (e.g., vehicle orientation, ambient light level, sun direction, etc.), enabling the system to adapt the digital source image to create a visual effect. For example, simulating the lighting of the real world on the virtual object as the vehicle travels, changes direction or the real-world conditions change (e.g., day, night, weather, etc.), or opposing the real-world conditions to reinforce a visual effect (e.g. opposing direction of sunlight, etc.)

Facial tracking (e.g., head, face, eye, etc.) of the viewer can provide data input for optimizing the viewing angle by adjusting the position of the digital image 505. This can be accomplished by adjusting the position of the image 525 on the digital display 522 and by adjusting the physical orientation or position of elements of the arrangement. In some embodiments, the position of the digital display with respect to the mirror arrangement or the orientation angle of the mirror arrangement itself (i.e., the mirrored enclosure) may also be adjusted.

Head, facial, and eye-tracking may also provide input to the system that is powering the display of the apparatus 600. The input or data provided to the system to the display image may allow for the creation of a parallax effect or digitally render an image as a 3D object that changes with eye position. Such that user 604 can look behind or around the object as the tracking apparatus tracking the movement of the user's facial features (e.g., head, face, eyes, etc.). The facial tracking data can also adapt the system (e.g., source image on the digital display, physical relationship) of the apparatus 500 to adjust the mirror arrangement to known or previously determined and stored user positions and orientations.

Head, facial, or eye-tracking measurement devices may be the primary means of adjusting the apparatus and may provide the most fidelity. Another means might also be an occupancy sensor that provides supplementary information. When adjusting the eye box, the vertical position of the head may be the driving factor.

The apparatus 500 may be in different locations of a vehicle. Some possibilities are in the front, rear, or center of the cabin dependent on the optimal viewing angle, the position of the desired user or users (e.g., driver, front, or rear passenger). In one example, the device may be in a central location at the front of a vehicle (i.e., vehicle dashboard) to display information to a driver. In another example, the apparatus 500 may be in the rear (i.e., center armrest, ceiling headline, or as a chandelier/light feature) to display information to a rear passenger.

Figure 6:
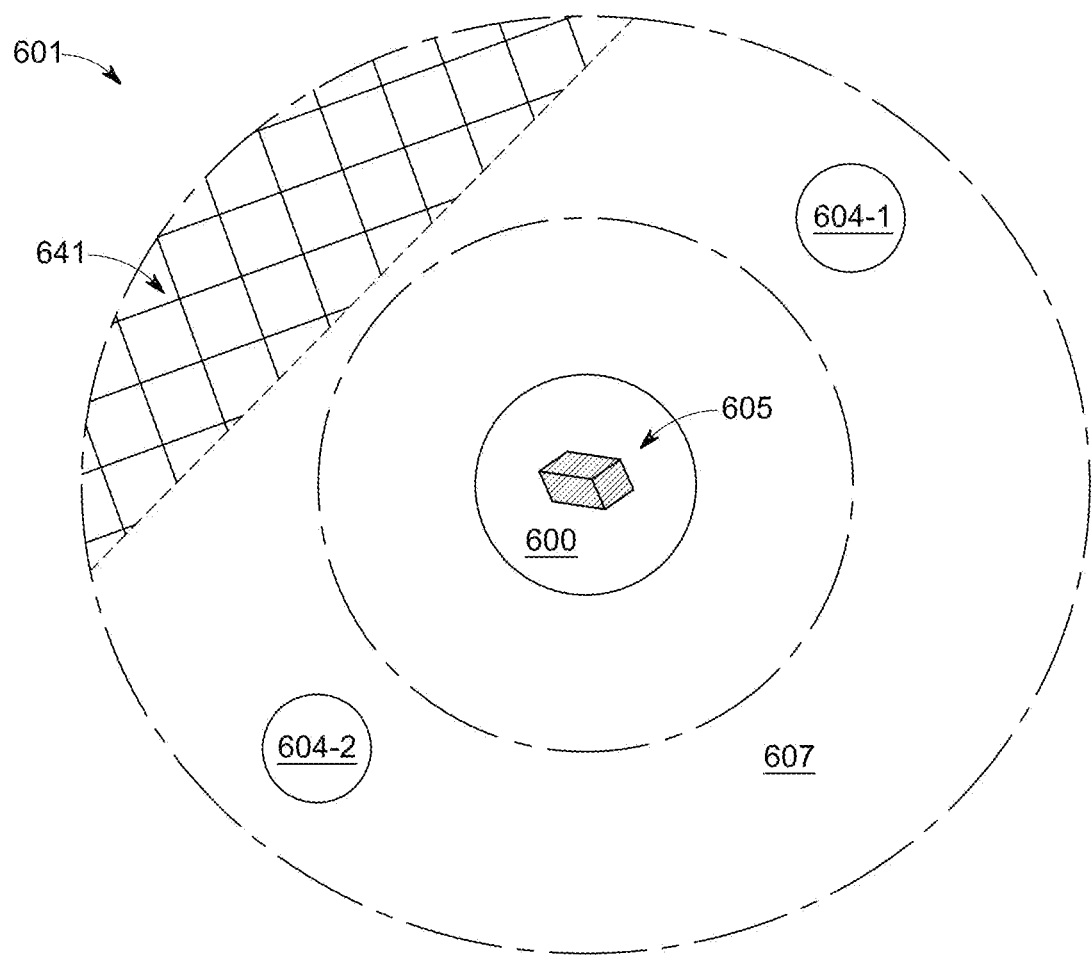
FIG. 6 sows a top-down view where an embodiment of a holographic display apparatus is adjusted to align an eye box with a view of a plurality of users.

FIG. 6 shows a top-view 601 where an embodiment of a holographic display apparatus 600 is adjusted to align an eye box 607 with a view of a plurality of users 604-1, 604-2. The apparatus may be adapted to obtaining the head position and/or eye position of the plurality of passengers 604-1, 604-2. The apparatus may calculate the positions of the rays or vectors emitted from the display based on an average position of the plurality of passengers' head positions or eye positions. In this way, the eye box 607 can be adjusted to keep the plurality of passengers' heads 604-1, 604-2 within the eye box.

In one embodiment, a camera-based sensor can be used to calculate or estimate the position of the viewer's heads or eyes 604-1, 604-2. The vector positions can then be calculated to determine the average position to optimize the view to accommodate multiple viewers. The eye box 607 may be relatively big and is 360 degrees around the center of the mirror in a doughnut shape. This allows for multiple viewers to experience the hologram 605 at the same time. In other embodiments, the vector positions are calculated based on a weighted algorithm. For example, the algorithm prioritizes including the driver of a vehicle if the apparatus 600 displays driving information. The algorithm may also exclude a user who requires more frequent adjustments due to their head movement or orientation. The algorithm may priority viewers that provide more sustained focus, measured through eye-tracking, than those that are not paying attention to the hologram 605. These weighted algorithms may allow for numerous eye boxes to be created that differ from the optimal viewing angle for each individual passenger.

FIG. 6 also shows an embodiment where the eye box is partially occluded 641 due to a section of the enclosure of the apparatus 600 that is removed, as shown in FIG. 4B. The removal of the portion of the enclosure reduces the range of viewing angles that is possible as compared to an apparatus where the portion is not removed.

Figure 7:
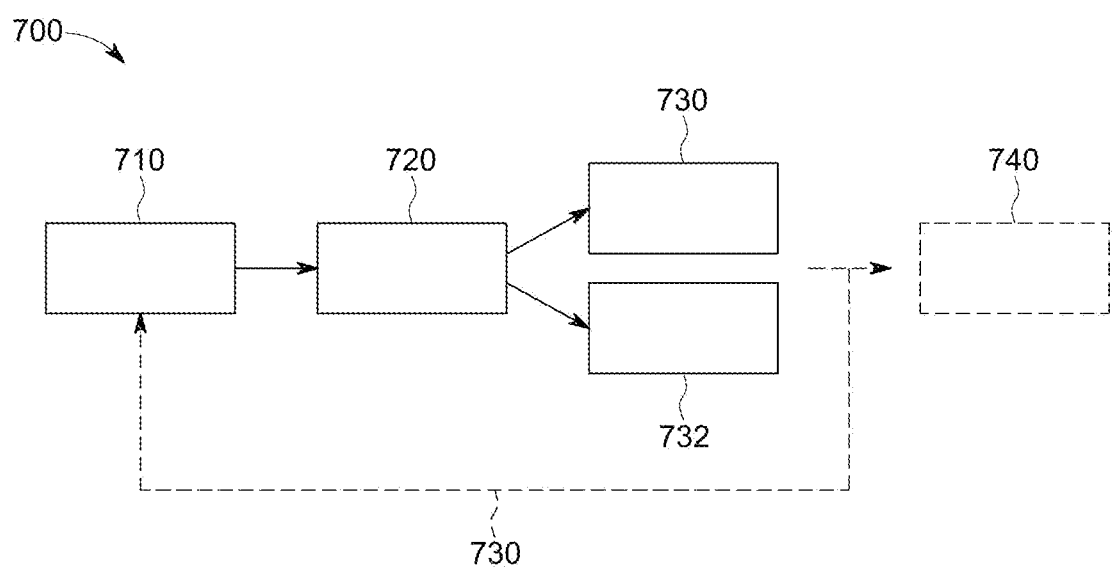
FIG. 7 shows a block diagram of a method for adjusting an embodiment of a holographic display apparatus.

FIG. 7 shows a block diagram 700 for a method for adjusting an embodiment of a holographic display apparatus. The apparatus comprises a rod housed in the apparatus. The rod has a display at the distal end of the rod. An aperture at the distal end of the apparatus is adapted to receive the distal end of the rod. Method 700 comprises obtaining 710 a position of at least one passenger and displaying 720 an image on the display to at least one passenger. Method 700 further comprises using the position of at least one passenger to adjust the rod 730 along a longitudinal axis of the apparatus, adjust an image position 732 on the display along a surface of the display, or both. Adjusting the rod and the image position creates a holographic image for at least one passenger at the aperture. This is because adjusting the rod and the image position alters the positions of a plurality of vectors or rays emitted from the image on the display to form a holographic image for at least one passenger.

Method 700 may further comprise adjusting the rod 730 to a position substantially adjacent to the aperture creates a flat image for at least one passenger at the aperture. In another embodiment, obtaining 710 a position of at least one passenger comprises receiving at least one passenger's seat position or eye position.

Optionally, method 700 may repeat 730 while the rod is in an open position. The repeating method obtains 710 the position of at least one passenger and adjusts the rod 730, and image position 732, or both of the holographic display apparatus. Method 700 may be repeated any number of times. For example, method 700 may be repeated until a predefined environmental context is achieved. If the method is performed by an artificial intelligent agent, repeating method 700 may improve its performance, because the data may be improved. For example, the user may not always be in favor of the adjustment of the eye box that an artificial intelligence agent may have learned and executed. Thus, the user can freely update it at his wish. This may be done by the user adjusting their viewing behavior so that the artificial intelligence agent learns a new adjustment routine. The agent may also change the learned routine and determine if the changes result in a better viewing experience for the user (e.g., by measuring feedback such as eye contact or reduced head movement). This allows the artificial intelligence agent to better learn of the user's behavior from those occasional changes as feedback and may reduce the interaction from the user. This use case may illustrate how the algorithm, e.g., the artificial intelligence agent, can help the user. Since the algorithm itself may be more generic and may learn user behavior based on the data that may lead to the use cases and features.

Method 700 or the repetition of the method 730 may cease when the rod is adjusted to a closed position 740. In an embodiment of method 700, displaying 710 the image continues when the rod is adjusted to the closed position 740. At this point, the method is displaying what is directly generated by the display and is not display a holographic or virtual image In some embodiments, the apparatus may be coupled to a control module. The control module may be implemented using one or more processing units, one or more processing devices, any means for processing, such as a processor, a computer, or a programmable hardware component being operable with accordingly adapted software. Similarly, the described functions of the control module may as well be implemented in software, which is then executed on one or more programmable hardware components. Such hardware components may comprise a general-purpose processor, a Digital Signal Processor (DSP), a micro-controller, etc.

In an embodiment, the apparatus may comprise a memory and at least one processor operably coupled to the memory and configured to perform the above-mentioned method.

Any of the proposed methods may be implemented on a computer. The method may be stored as instructions for a computer or other apparatus on a non-transitory, computer-readable medium. When the medium is read by a computer, the method may be performed or executed by the computer or any apparatus networked with the computer. A computer-implemented method may provide a reinforcement learning-based algorithm to autonomously learn user behavior under a different context. The method may do not need supervised annotation data and can efficiently and automatically learn on a small set of data adaptively. It may be getting more useful when dealing with a sequence of decisions and actions that may be a common usage scenario but distracting the user's attention.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or another programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes, or -operations.

If some aspects have been described in relation to a device or system, these aspects should also be understood as a description of the corresponding method. For example, a block, device, or functional aspect of the device or system may correspond to a feature, such as a method step, of the corresponding method. Accordingly, aspects described in relation to a method shall also be understood as a description of a corresponding block, a corresponding element, a property, or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed unless it is stated in the individual case that a particular combination is not intended. Furthermore, features of a claim should also be included for any other independent claim, even if that claim is not directly defined as dependent on that other independent claim.

What is claimed is:

1. A volumetric display apparatus for a vehicle comprising:
   a rod with a proximal end and a distal end, wherein a display is disposed on the rod's distal end,
   an enclosure for the rod having a proximal end, a distal end, and an interior,
   wherein the proximal and distal ends are centered on a longitudinal axis passing through the interior,
   wherein a surface of the interior is mirrored,
   wherein the enclosure's distal end comprises an aperture adapted to receive the rod's distal end,
   wherein the rod is adjustable along the longitudinal axis of the enclosure from a closed position to an open position,
   wherein the rod's distal end substantially fills the aperture in the closed position,
   wherein the open position extends from the closed position to the proximal end of the enclosure, and
   wherein a holographic image is formed at the aperture of the enclosure when a plurality of light vectors emitted from the image on the display are reflected off the mirrored surface of the interior while the rod is in the open position, and
   wherein a flat image is formed at the aperture of the enclosure when the rod is in the closed position.

2. The apparatus of claim 1 wherein the hollow interior of the enclosure is cylindrical.

3. The apparatus of claim 1 wherein the rod is substantially cylindrical.

4. The apparatus of claim 1 wherein the aperture comprises glass.

5. The apparatus of claim 1, wherein the apparatus is capable of being disposed in one of the vehicle's:
   armrest,
   pillar,
   dashboard,
   bonnet,
   headliner, or
   console.

6. The apparatus of claim 1 wherein the hollow interior of the enclosure is ellipsoidal.

7. The apparatus of claim 1 wherein the hollow interior of the enclosure is a partial ellipsoid.

8. The apparatus of claim 1, wherein the vehicle is configured to transport at least one passenger, and the holographic image is adjusted based on a position of the at least one passenger.

9. The apparatus of claim 8, wherein the position of the at least one passenger is determined by at least one of:
   a measurement apparatus, or
   a plurality of seat settings.

10. The apparatus of claim 9, wherein the position of the at least one passenger is determined by the measurement apparatus, wherein the measurement apparatus at least one of:
    head tracking apparatus,
    face tracking apparatus, or
    eye tracking apparatus.

11. The apparatus of claim 8, wherein the holographic image is adjusted based on by at least one of:
    adjusting a position of the rod in the open position; and
    adjusting a position of the image on the display.

12. The apparatus of claim 11, wherein the position of the at least one passenger is determined by an occupancy sensor.

* * * * *